(12) United States Patent
Lundin (10) Patent No.: US 11,473,259 B2
(45) Date of Patent: Oct. 18, 2022

(54) OIL SPILL RESPONSE UNIT (71) Applicant: M & L Patent Oy Ab, Hangonkylä (FI)

(72) Inventor: Lars Lundin, Hangonkylä (FI)

(73) Assignee: M & L Patent Oy Ab, Hangonkylä (FI)

(*) Notice: Subject to any disclaimer, the term of this patent is extended or adjusted under 35 U.S.C. 154(b) by 0 days.

(21) Appl. No.: 16/978,734

(22) PCT Filed: Mar. 7, 2019

(86) PCT No.: PCT/FI2019/000003
§ 371 (c)(1),
(2) Date: Sep. 7, 2020

(87) PCT Pub. No.: WO2019/170957
PCT Pub. Date: Sep. 12, 2019

(65) Prior Publication Data
US 2020/0399849 A1 Dec. 24, 2020

(30) Foreign Application Priority Data
Mar. 7, 2018 (FI) .................................. 20187031

(51) Int. Cl.
*E02B 15/04* (2006.01)
*B63B 35/28* (2006.01)
(Continued)

(52) U.S. Cl.
CPC ............ *E02B 15/047* (2013.01); *B63B 35/28* (2013.01); *E02B 15/102* (2013.01); *B63B 35/32* (2013.01);
(Continued)

(58) Field of Classification Search
CPC .... E02B 15/046; E02B 15/047; E02B 15/048; E02B 15/102; B63B 35/32
(Continued)

(56) References Cited

U.S. PATENT DOCUMENTS 3,348,690 A    10/1967  Cornelissen
3,612,280 A *  10/1971  Fitzgerald ............. E02B 15/048
                                                     210/242.3
(Continued)

FOREIGN PATENT DOCUMENTS

CN    101804851 A    8/2010
EP      0012067 A1   6/1980
(Continued)

*Primary Examiner* — Christopher Upton
(74) *Attorney, Agent, or Firm* — Laine IP Oy; Mark W. Scott (57) ABSTRACT Oil-collection system and oil-collecting barge. The system comprises a towing vessel and a transport barge, which has a catamaran structure, so that there are oil collectors in its pontoons. Guide booms are attached to the sides of the barge, with a structure that is tubular frame around a wall, in which the air space or volume of the lowest tube corresponds to the boom's own weight. When using a larger capacity in collection, the additional booms on the deck are filled with air and simultaneously pulled into operating condition with the aid of auxiliary boats, when towable booms are formed. With the aid of the invention, transport barge with a rapidly moveable structure, equipped with oil collectors is obtained, which can be attached to a towing vessel, and which in maritime conditions is stable and operable when towed. Thus a highly steerable unit is obtained for operative oil-spill-response tasks, in which the necessary hydraulics and other energy requirements of the equipment are connected from the towing vessel. In the case of an accident, the unit on operational stand-by departs for (Continued)

the accident site, where collection operation is started by rotating the barge's booms to the operating position.

22 Claims, 7 Drawing Sheets

(51) Int. Cl.
  *E02B 15/10* (2006.01)
  *B63B 35/32* (2006.01)
  *B63B 21/56* (2006.01)

(52) U.S. Cl.
  CPC ....... *B63B 2021/563* (2013.01); *E02B 15/048* (2013.01)

(58) Field of Classification Search
  USPC ... 210/170.05, 170.09, 170.11, 242.3, 747.6, 210/776, 923

See application file for complete search history.

(56) References Cited

U.S. PATENT DOCUMENTS

| | | | | |
|---|---|---|---|---|
| 3,684,095 | A | * | 8/1972 | Ayers .................... E02B 15/048 |
| | | | | 210/242.3 |
| 3,701,430 | A | * | 10/1972 | Tuttle .................... E02B 15/048 |
| | | | | 210/242.3 |
| 4,182,679 | A | | 1/1980 | Van Hekle |
| 4,388,188 | A | * | 6/1983 | Morris ................... E02B 15/048 |
| | | | | 210/242.3 |
| 4,673,497 | A | * | 6/1987 | Lundin ................... B63B 35/32 |
| | | | | 210/242.3 |
| 5,102,540 | A | * | 4/1992 | Conradi ................ E02B 15/046 |
| | | | | 210/242.3 |
| 5,137,630 | A | | 8/1992 | Eklund |
| 2012/0085693 | A1 | | 4/2012 | Desantis et al. |

FOREIGN PATENT DOCUMENTS

| | | | |
|---|---|---|---|
| EP | 0207623 | A2 | 1/1987 |
| EP | 0834341 | A2 | 4/1998 |
| EP | 2678217 | B1 | 5/2018 |
| FI | 80746 | B | 3/1990 |
| WO | WO9739194 | A1 | 10/1997 |
| WO | WO 2006/134201 | * | 12/2006 |
| WO | WO2012110686 | A1 | 8/2012 |

* cited by examiner

OIL SPILL RESPONSE UNIT

FIELD OF THE INVENTION

The invention relates to maritime oil-spill response. The invention particularly relates to an oil-spill response and collection unit, defined in the preamble to claim 1, and a barge, defined in the preamble to claim 16.

BACKGROUND TO THE INVENTION

There are problems relating to oil collection by the type of oil-collection vessel equipped with inclined booms. Such oil collection is represented, for example, by the solution disclosed in EP patent publication 0 207 623. In it, the diving of the floats of the inclined booms conforming the sea surface causes difficulties in the operation of the guide booms guiding the oil, which remains uncollected. In some cases, the swell causes the inclined booms to break. A common problem in collection is the effect of the waves in a rough sea and the limitation of oil collection. The solution of the problem requires an effective and constantly operating oil-collection response and collection unit, suitable for a rough sea and equipped with guiding booms, by which oil is guided for collection into the space between the booms.

A separate collector, arranged in front of the bow of a vessel, is known from US Pat. No. 4,182, 679 A. The operation and control of such a collection solution is difficult, particularly in a rough sea. An oil-collection barge is in turn known from US application publication 2012/085693, which comprises an oil-collection sack located in a frame, by which oil is collected through the open front part of the barge. In such a solution, the propeller wash of the vessel towing the barge disperses the oil being collection, obviating the results of the collection.

SUMMARY OF THE INVENTION

The invention is intended to create a new type of solution for maritime oil-spill response by using in operative oil-spill response an oil-collection system, in this case a "collection unit", which is formed of a towing vessel and a transport barge, the latter of which acts as the oil-collecting part.

According to the invention, the oil-collecting barge is particularly in a catamaran form of at least two pontoons, which form the sides of the barge, in which the oil-collectors are located. The front of the barge can be attached, e.g., with the aid of supports, to the stern of the towing vessel.

The collection unit according to the invention comprises a towing vessel and, attached to its stern, a catamaran-type transport barge, in which there are oil-collectors located in the sides of the barge to collect oil from the sides of the barge. The barge can be attached from its bow to behind the towing vessel to for a single unit, in such a way that the barge's pontoons are located in the barge's longitudinal direction on each side of the propeller wash produced by the towing vessel, to permit the unobstructed collection of oil from the sides of the barge.

More specifically, the solution according to the invention is characterized by what is stated in the characterizing portion of the independent Claims.

Considerable advantages are achieved by the invention.

Thus, with the aid of the invention a rapidly moveable transport barge, equipped with oil collection, can be joined to a towing vessel, and which in sea conditions is stable when towed and ergonomic in operation. Thus for operative oil-spill response tasks an easily controlled unit is obtained, in which the hydraulics and other energy needs of the equipment are connected from the towing vessel. When an accident happens, a unit on stand-by leaves for the site of the accident, where collection operations are started by rotating the barge's booms to the operating position.

What is important relative to an oil-spill response system like that of EP publication 0 207 623 in that in in heavy weather during collection the angle of the oil-guiding boom relative to the side of the pontoon can be adjusted without disturbing collection. Of course, the amount of oil collected is reduced, but collection can nevertheless continue. If necessary, the transport barge's booms can be extended using telescopic extension booms, the length of which is adjusted hydraulically.

By constructing the towable transport barge in a catamaran form a solution is created that avoids particularly the water masses of the propeller wash disturbing the operation of the oil-collecting brushes of the oil collectors.

For this reason, and because oil collection takes place from the sides of the barge, the transport barge according to the invention can be arranged to be towed behind even a single vessel.

During collection, oil is guided to be collected by collectors installed in the pontoons and from there to be bagged, for example, using the Non-Stop method into sacks of a hydraulically operated bagging device located in the centre space between the hulls. By opening the bagging device, the filled sacks are dropped from the centre space between the pontoons into the water, when the tug's propeller wash moves the sacks away to the sea to be picked up. To collect oil that has spread widely over a sea area, wiping breadth is increased by attaching retractable additional booms, using accessories on the ends of the transport barge's booms.

In such a situation, if necessary collection capacity is further increased using outwardly rotating brush cassettes or similar with a large capacity, which can be adjusted to different positions relative to the sea surface according to the composition of the oil. To collect loose seaweed and other rubbish mixed with the oil on the sea surface, outwardly rotatable scoop-like mesh rubbish collectors are attached, if necessary to the rotation structure, from which the rubbish is dropped into troughs in the pontoons. The rubbish collectors are mainly operated while collection takes place, using drum collectors located in the pontoons.

BRIEF DESCRIPTION OF THE DRAWINGS

In the following, examples of embodiments are described with reference to the accompanying drawings, in which.

DESCRIPTION OF EMBODIMENTS

The technology presented creates a new type of solution for maritime oil-spill response. Tug vessels made and intended for a special purpose, i.e. towing, are generally not made for use as oil-spill response vessels. Due to the shape of the hull of the type of vessel and the lack of working spaces on deck, it is difficult to install present oil-spill response systems on a tug.

Being stable and excellent, tugs are, however, at their best when running in a rough sea and thus permit oil-spill response when waves begin to hinder operations. In addition, tugs' operating scope includes a continual readiness accelerates departure and improves operative preconditions for maritime oil collection.

The present embodiments thus utilize a tug in the oil-spill response unit, in which a transport barge equipped with oil-spill response devices is connected to a tug as part of the oil-collecting oil-spill response unit.

In one embodiment, a deep-draught tug is used as the tug. Deep-draught, stable tugs work well in a rough sea. They also permit oil-spill response particularly in demanding conditions, when other vessels' operations are hindered or even prevented. When being towed at high speed the aforementioned oil-collecting unit's transport barge, the barge operates best when towed by a deep-draught tug with the attachment being horizontal relative to the sea surface.

Rapid arrival at the accident site is essential, the operational possibilities being time-limited. Therefore towing operationally-ready and suitably ergonomically acting equipment is a good solution.

On the basis of the above, in the embodiment the transport barge is connected to the towing vessel's stern by supports located on its bow, e.g., most suitably over the entire width or essentially the entire width of its front edge. The supports dampen the movements of the barge in a rough sea.

In a preferred embodiment, the towing of the transport barge is implemented by the steering turning force being arranged in the area between the vessel and the barge, i.e. the tug's steering part (combination of propeller and steering wheel), when steering acta appropriately in response tasks. This permits a following movement in the barge and the unit remains easily steered.

In a preferred embodiment, in the transport barge there is a front part, which forms the barge's bow, and a rear part, which is arranged at a distance from the front part and forms the barge's stern, and side parts connecting the front and rear parts, which form the barge's sides. In the barge's sides and/or outside them are arranged oil collectors, i.e. oil-collecting elements. The barge's geometric centre axis in the barge's longitudinal direction (i.e. the centre axis extending from the bow to the stern), is at least essentially parallel to the side parts. The barge is attached by its front part to the stern of the towing vessel to tow the barge behind the vessel essentially in the direction of its centre axis. Oil can then be collected from the sides of the barge, with the aid of oil collectors arranged in the side parts and/or in connection with them.

In a preferred embodiment, there is a channel in the barge's lower part, parallel to its longitudinal axis, through which the towing vessel's propeller wash is guided from the barge's front part to its rear part under the barge and behind it. Thus the water mass of the towing vessel's propeller wash cannot disperse the oil being collected from the barge's sides.

In a preferred embodiment, the transport barge comprises at least two pontoons attached to each other, which together form a structure like a catamaran. Between the pontoons remains an open space, through which the water mass of the propeller wash can flow.

By combining floating pontoons with, e.g., a deck, a transport barge like a catamaran is obtained that is stable in maritime conditions, in the pontoons of which, particularly in both pontoons, oil collectors, e.g., in the form of brush systems, can be located for oil collection. In one embodiment, the first brushes in the barge are located inside the pontoons and the others are located outside the side of the barge.

According to one preferred embodiment, outwardly rotatable, oil-guiding booms are attached to both outer sides of the transport barge, for example, using hinges. These are operated by suitable operating devices, such as hydraulic cylinders. Extensions, i.e. additional booms, can be attached to the end parts of the booms. The outwardly rotatable guide booms are made from, for example, aluminium. They can be modified in accordance with practical operations.

An oil collector typically includes one or more drum brushes.

In one embodiment, the collectors installed inside the pontoons are intended mainly for collecting diesel and crude oil. Collectors, such as a drum brush, brush cassettes, or a combination of both, according, for example, to EP patent 2 678 217 can be used as such collectors. The water to be processed is led to the collectors through the oil collector's collection opening formed most suitably in the pontoon.

In one embodiment, the collectors are situated in the pontoon at a partial slant, i.e. the angle of the boom conforms to the direction of travel of the water and oil to the brushes, and as far back as possible, so that the distance between hinges of the rear edge of the pontoons' collection opening and the bow of the barge is made as long as possible.

A collector located in the space between the edge and the barge's boom can be used mainly for collecting a larger amount of heavier oil.

Here too, brush solutions known from, for example, EP patent 2 678 217 can be used, such as drum brushes, brush cassettes, or a combination of both.

In one embodiment, the collector used in the transport barge includes, e.g., a first separator installed in the flow channel in the water's direction of flow, which forms a brush cassette forming a separation surface rising at an angle from the water in the water's direction of flow and a frame module in the flow channel after the brush cassette, on which the brush cassette is supported and in which is a second separator equipped with a rotating drum brush and water-removal openings for removing the cleaned water and, e.g., leading it to the return channel.

When considering safety, particularly in the case of crude oil, the intention is to use hydraulics for operation, in order to avoid the danger of explosions.

A tubular structure is well known as a strong structural shape, which withstands bending well. By constructing the transport barge's booms particularly in such a way that around the wall of the boom is a tubular frame, the air space/volume of the lowest tube corresponds to the boom's own weight, a strong boom that supports itself in the water is obtained for this purpose.

In a preferred embodiment, the boom is modified so that its height is at least that of the rear edge of the collection opening and the length from the hinged rear edge of the collection opening to the point of the pontoon. In this way the maximum length is obtained for the barge's booms. Wings are attached to the lowest tube to prevent the barge from rolling.

An oil-guiding boom constructed with a tubular frame, turned outwards by a cylinder, and with a long reach balances the transport barge in sea conditions. The boom includes appropriate hinges and attachment, e.g., a standardized attachment, such as a universal sliding joint.

To collect oil that has spread over a wide are of sea, air-filled booms, in this case additional booms, equipped with universal sliding joints, for example, are attached to the end of the transport barge's booms. This creates a line of booms that moves smoothly in the water, thus assisting in maintaining the barge's lateral equilibrium in a rough sea.

At the same time, a powerful lifting and carrying effect acting on the ends of the booms is created, which especially effectively stabilizes the barge's lateral listing movement to follow the surface of a rough sea.

The use of air-filled booms attached to the ends of the transport barge's guide booms also minimizes the pressure of the water acting laterally, and facilitates keeping the booms straight during towing.

In one embodiment, to facilitate attachment to the booms the additional booms are located reeled up on the front end of the barge's deck. The boom is reeled double, so that it can be pulled out of the reel in the correct way. In this way, both ends of the boom can be handled simultaneously.

Once the barge's boom and additional boom are connected, air-filling and towing of the additional boom is commenced using an auxiliary boat. The barge's booms are adjusted and the additional booms pulled ready for operation. By attaching an additional boom to the end of a boom extending from the barge the water pressure acting laterally is minimized and breaking of the boom is prevented. If the additional boom is located in an auxiliary boat, attachment takes place in a similar way. When manufacturing the additional boom from rubber or PVC plastic, attention must be paid to the ratio of the boom's air capacity to the required stabilization of the barge.

If a larger amount of oil is to be collected, brush cassettes attached to the pontoons' rotating structures in a preferred embodiment of the present technology are used, which when collecting oil can be adjusted to different attitudes relative to the sea surface according to the composition of the oil.

The term "rotating structure" refers, for example, to an outwardly rotating support structure located in the pontoon and made mainly from piping.

In one embodiment, adjustable plate structures such as triangles are attached to both sides of the brush structure and seal the space of the brush cassette between the outer side of the pontoon and the boom, thus preventing oil from escaping around the brush structure. For receiving the collected oil, in the rotating structure of the upper end of the cassette, e.g., a trough equipped with a net, from which oil is transferred, for example by a pump, through a hose to storage.

In one embodiment, brush cassettes adjustable to different attitudes relative to the sea surface, according to the composition of the oil, are attached to the rotating structures of the pontoons. To prevent oil escaping, most suitably adjustable guard plates, such as triangles, are attached to them on both sides. These plates (triangles) seal the brush cassettes, when run into the space between the outer side of the pontoons and the booms.

The tug-transport barge line, i.e. the oil-spill response unit, is intended to be kept rigid during collection, using at least two supports between the tug and the barge. The intention is to attach supports to the points of the front edges of the of the outer edges of the barge's pontoons, or close to them, thus preventing the lateral movement of the barge during towing, but which permit the line to follow the tug's movements in a rough sea.

The use of supports permits the use of tugs with different and differently shaped hulls without having to alter the structure of the barge. In terms of durability, the supports' structural material must be strong, typically metal.

A good oil-recovery method is essential, especially in situations where there is a time limit before the oil reaches the shore. In such cases, the NON-STOP method (continuous collection) is particularly advantageous in operative tasks. This avoids the waste of collection time using vessels equipped with tanks or similar running to empty the tanks and return to collection. For example, in the Gulf of Finland with a southerly wind speed of 12 metres a second, oil would reach the shore at the Porkkala cape within 14 hours. In oil-spill responses in this area, the waste time of oil-spill response vessels in connection with emptying is estimated as 7-9 hours, when operating on the routes of tankers.

In one embodiment, in NON-STOP collection there is a frame-like, opening structure for bagging in the space between the pontoons.

In one embodiment, in NONSTOP collection there is at least one hydraulically operated opening bagging device, into the sack of which the collected oil is guided, like the bottom of a dredging barge, located in the space or centre space between the hulls of the pontoons. By opening the bagging device located in the centre space between the pontoons, the filled heavy sacks, with a capacity of up to 4-8 cubic metres, are dropped into the sea, and the tug's propeller wash moves the sacks out to sea to be picked up, i.e. to be collected later.

On the sea surface there is often seaweed and other rubbish mixed with the oil, which in collection prevents the oil from reaching the brushes. This problem concerns mostly the drum brushes inside the hills of the pontoon and not so much the brush cassettes, in which the rubbish sticks, being moved on to the mesh of the trough. If necessary, mesh-like, trough-like rubbish collectors are attached to the pontoon's outwardly rotating structure, through the opening in which the collected material is dropped into the troughs in the pontoon.

According to the above, in one embodiment oil-spill response refers to an oil-collection system formed of a towing vessel and a transport barge attached to the vessel to be towed by it, in which there are oil collectors, which oil collectors are arranged on the sides of the barge, so that the oil can be collected from the barge's sides.

Most suitably, in the transport barge there are at least two pontoons arranged at a distance from each other, which are joined together to form a structure like a catamaran, when the oil collectors are arranged in, or in connection with at least one, preferably both of the pontoons.

Particularly there are one or more oil collectors on each side of the barge and they comprise a brush drum, a brush cassette, or a combination of a brush drum and a brush cassette.

A particularly preferred embodiment comprises combining a tug and a transport barge equipped for oil-spill response to be used as an oil-spill-response unit. Operations then take place in such a way that, when an oil accident takes place, the barge equipped with oil-collection equipment is attached by supports to the tug, after which hydraulics and other necessary energy requirements are connected from the tug. When oil collection starts, the barge's guide booms are rotated to the collection position and, if necessary, the air-filled guide booms are connected and straightened for operation, with the aid of an auxiliary vessel. Collection is intended to take place mainly using the NON-STOP method, when total collection time is boosted by avoiding an unnecessary loss of collection time for tank emptying. Oil is collected from the sea to the hulls of the pontoons and the troughs of collection brushes situated in a rubbish collector, from where it is transferred to sacks in a bagging system using an oil-transfer system.

In the following, preferred embodiments are examined with the aid of drawings.

Figure 1A:
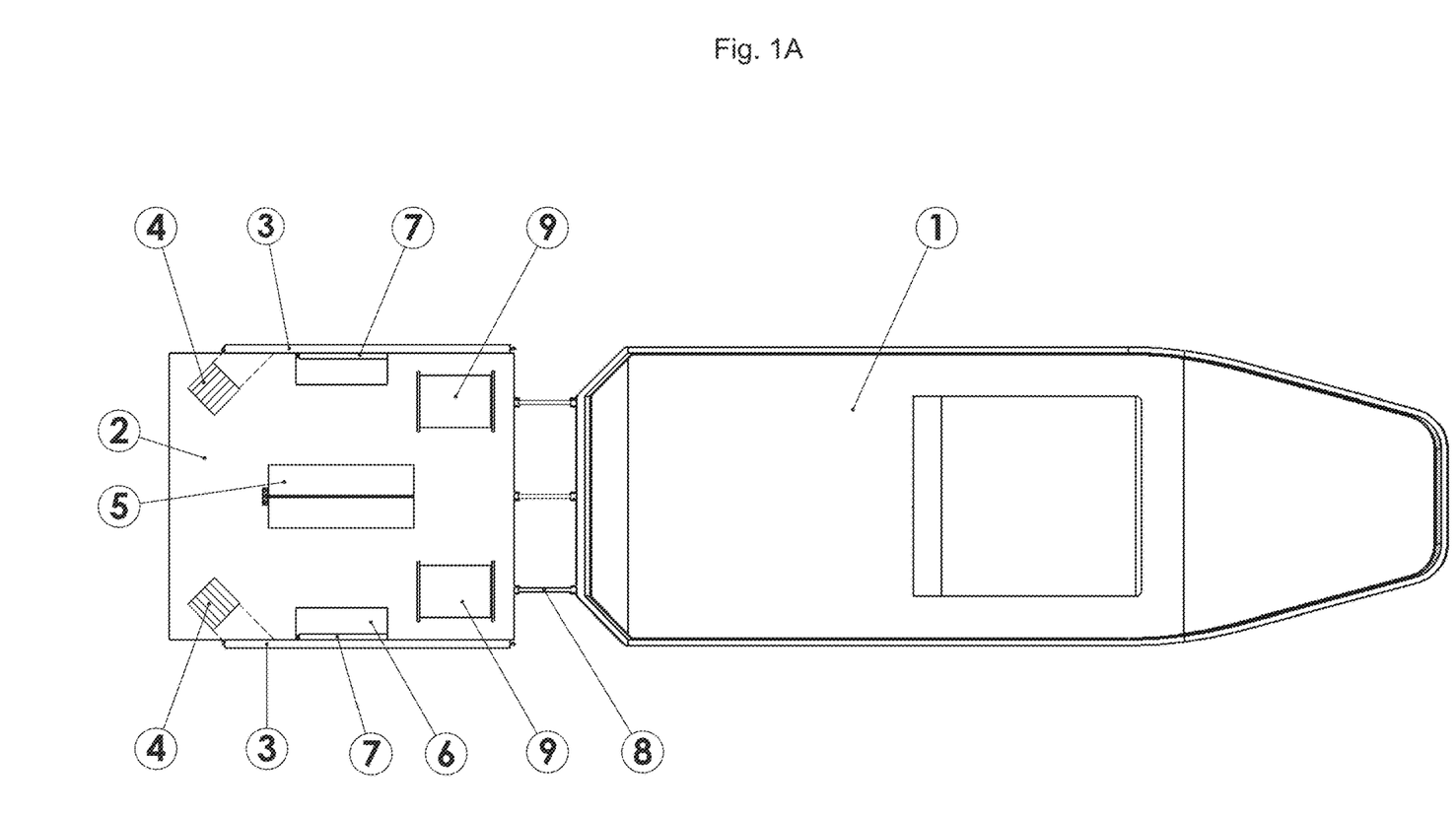
FIG. 1A shows a top view of the unit, in which the guide booms of the transport barge being towed are turned inwards.

FIG. 1A shows a top view of a unit, in which is a transport barge 2 and oil collectors 4 connected by supports 8 to a tug 1. Also shown are booms 3 installed on the outer side of the barge 2, the location of additional booms 9, a bagging device 5 for bagging oil, and a trough 6 situated in a rotating structure 7 and acting as a receiving station for collected rubbish.

Figure 2A:
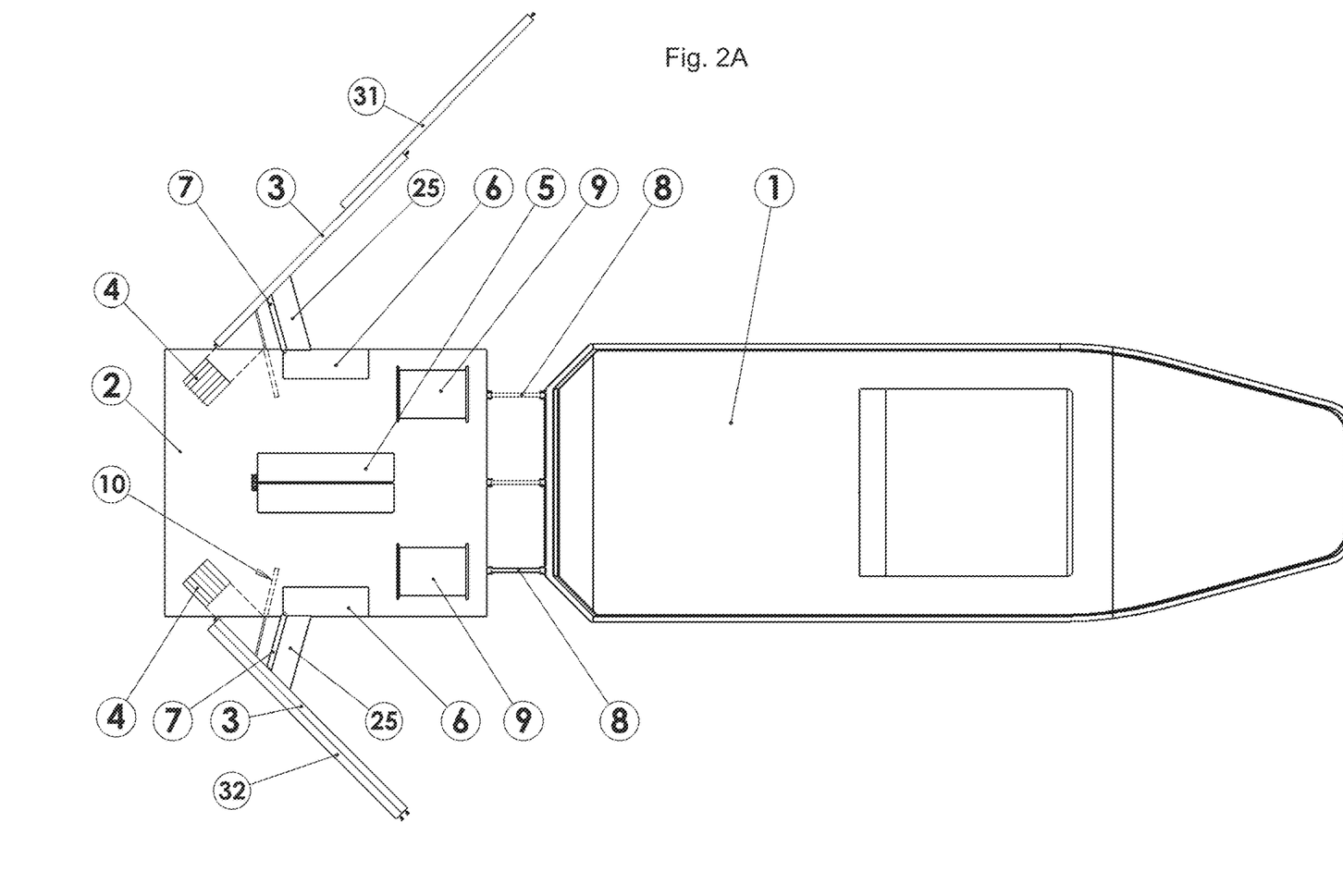
FIG. 2A shows a top view of the unit, in which the guide booms of the transport barge being towed are turned outwards.

FIG. 2A shows a top view of a unit, in which is a transport barge 2 connected by supports 8 to a tug 1, oil collectors 4, cylinders 10, outwardly rotating booms 3, and additional booms 9 on a reel, a bagging device 5 for bagging oil, rubbish collectors 25 attached to the rotating structure 7, and an extension boom in the operating position 31 and the resting position 32.

Figure 3A:
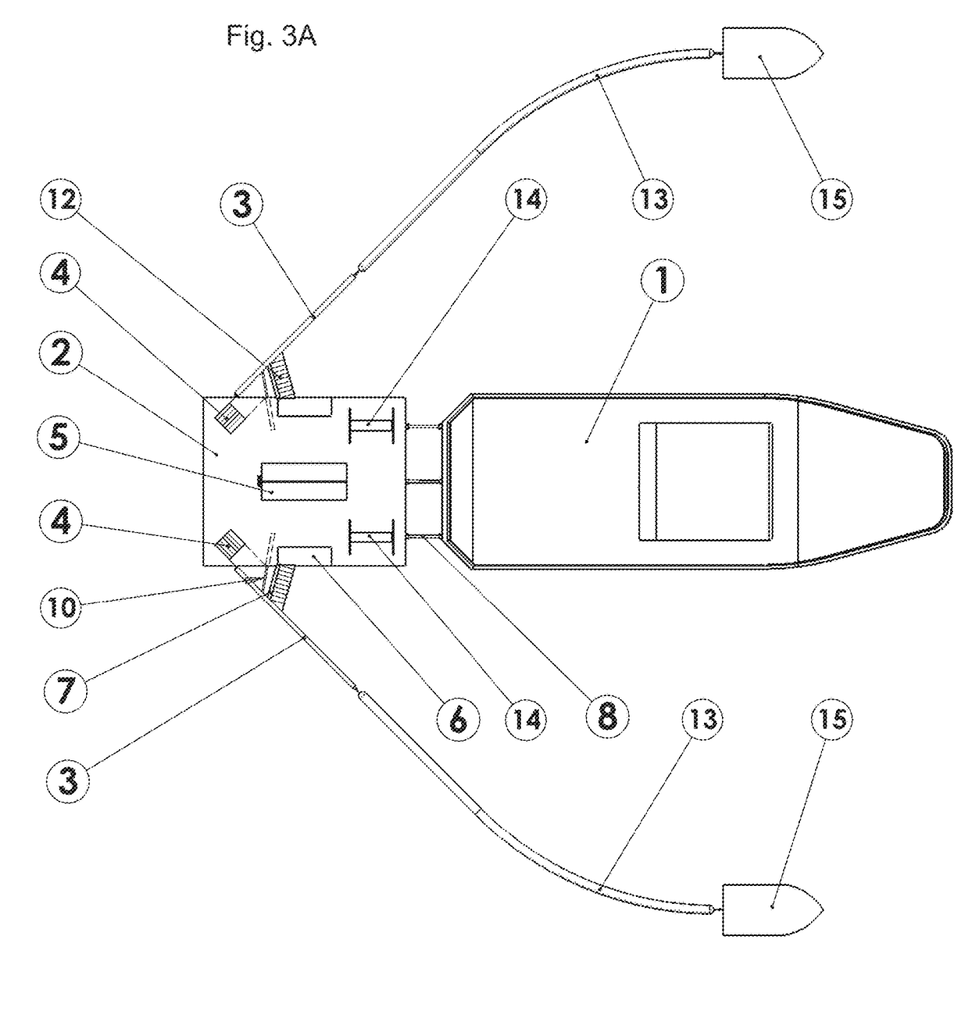
FIG. 3A shows a top view of the unit, in which air-filled guide booms are joined as additional booms to the outwardly turned guide booms of the transport barge being towed.

FIG. 3A shows a top view of a unit, in which is a transport barge 2 connected by supports 8 to a tug 1 and oil collectors 4 and 12 intended for different purposes. Also shown are cylinders 10, outwardly rotated booms 3 and towable booms 13 attached to them, and auxiliary boats 15. The figure also shows a bagging system 5 for bagging oil and brush cassettes 12 and boom reels 14 located on the rotating structure 7 of a trough 6.

Figure 4A:
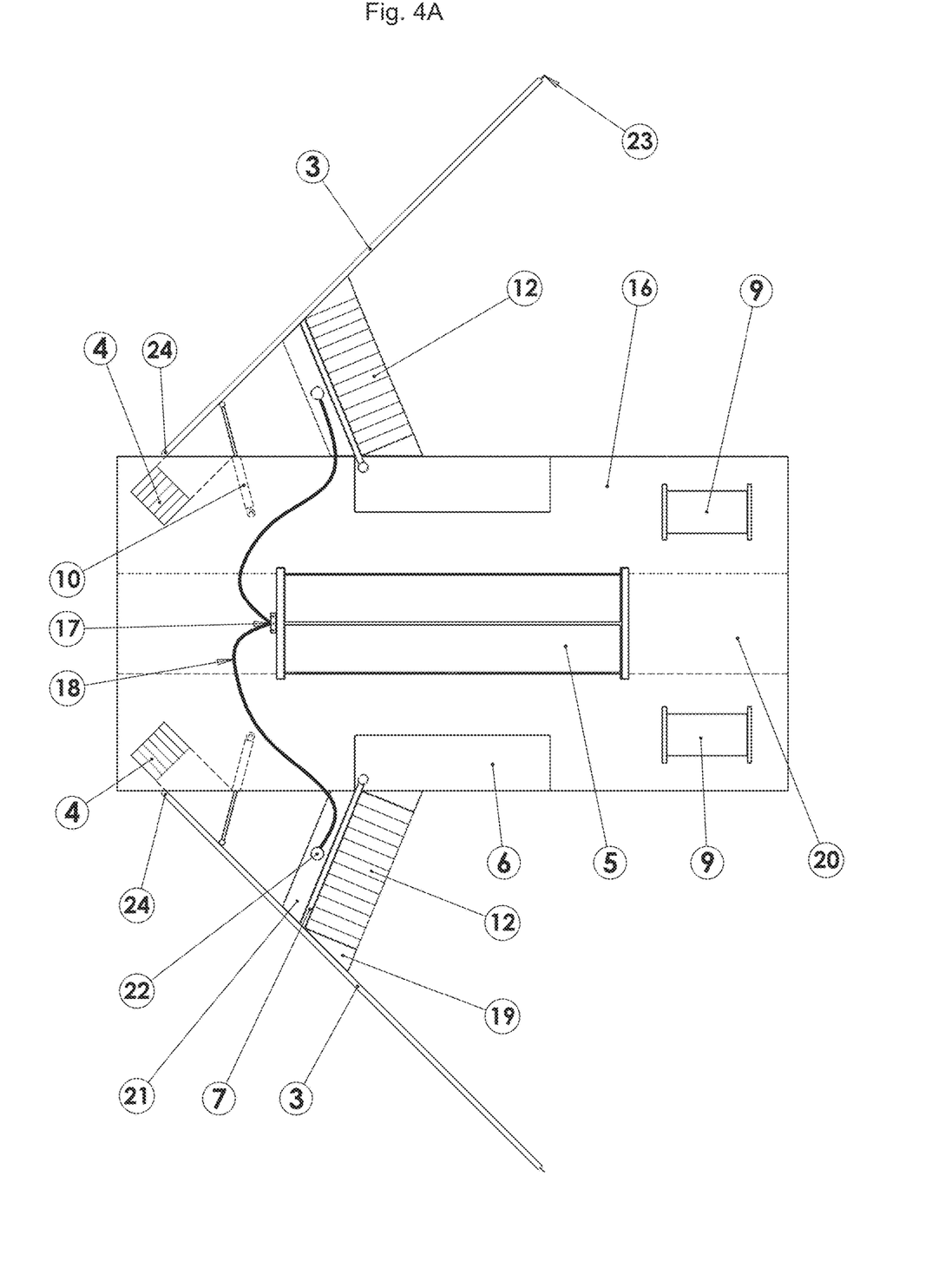
FIG. 4A shows a top view of the equipped transport barge, in which are located outwardly rotating guide booms, brush systems, and a bagging device.

FIG. 4A shows a top view of pontoons 16 connected by a deck 20, a control desk 17 and additional booms 9 located on the deck 20, and booms 3, at the end of which are quick-release connectors 23, operated by cylinders 10 equipped with hinges 24 attached to the sides of the pontoons 16. In addition, the figure shows oil collectors 4 and the location 12 from which the collector is situated in the pontoon 16, and a collector 12 equipped with a triangle 19 in the rotating booms 7. To operate, the collector 12 is equipped with a gutter 21, a pump 22, and a hose 18. The figure also show a bagging system 5 for bagging oil and a trough 6.

Figure 5A:
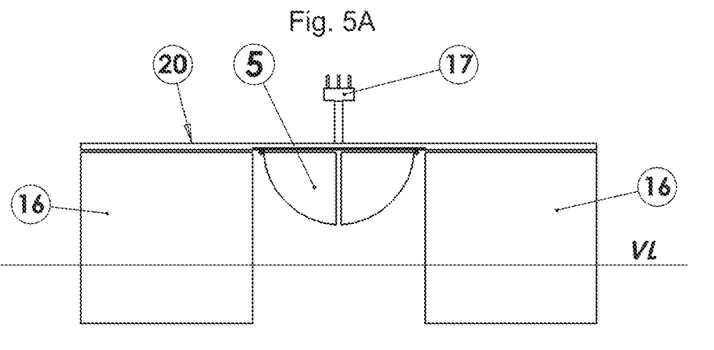
FIGS. 5A-C show a stern view of the transport barge, in which there is a closed and opened bagging system and a top view of part of the transport barge, which shows the bagging system and the location of the control desk.

FIG. 5A shows an end view of the closed bagging system 5 between the pontoons 16 and the control desk 17 situated on the deck 20.

Figure 5B:
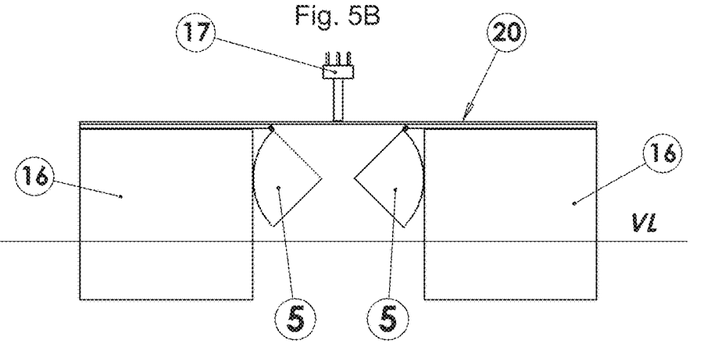

FIG. 5B shows an end view of the opened bagging system 5 between the pontoons 16 and the control desk 17 situation on the deck 20.

Figure 5C:
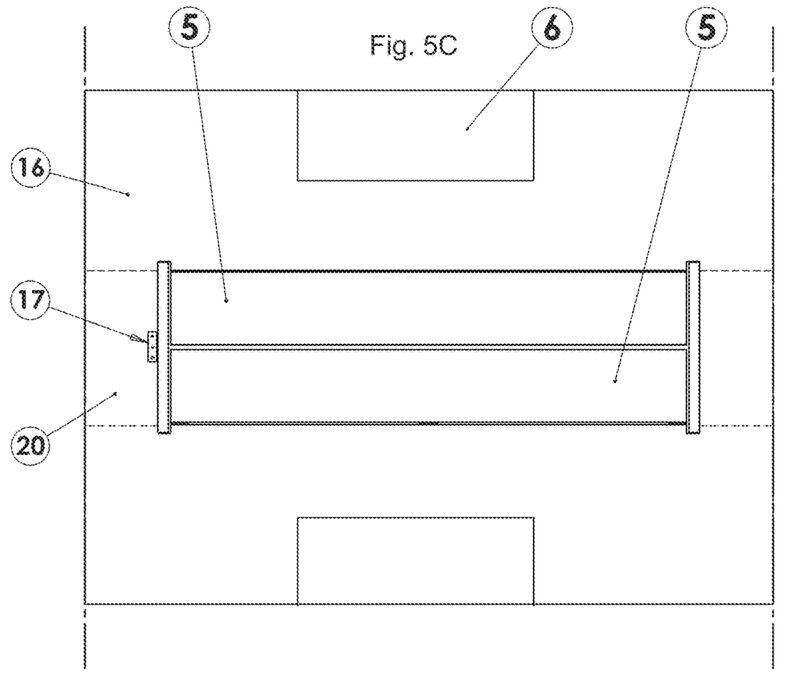

FIG. 5C shows a top view of the bagging system 5 located between the pontoons 16, the deck 20, the control desk 17, and the trough 6 of the rubbish-receiving station.

Figure 6A:
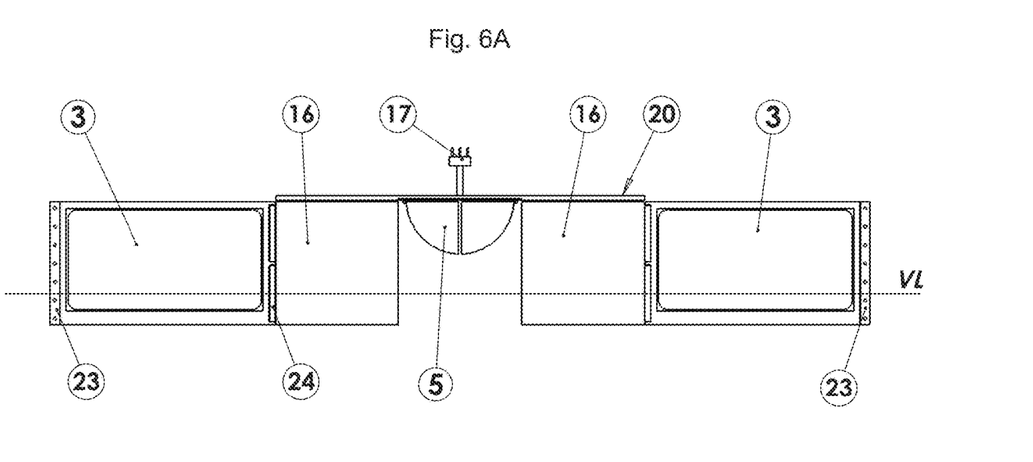
FIGS. 6A-C show a stern view and a side view of the control-desk equipped transport barge, in which there are outwardly rotated booms, a closed bagging system, a rubbish collector and its location.

FIG. 6A shows a stern view of the pontoons 16, the control desk 17 situated on the deck 20, and the outwardly-rotated hinged 24 booms 3 at the end of which are quick-release connectors 23. The figure also shows the bagging system 5 located between the pontoons 16 for bagging oil.

Figure 6B:
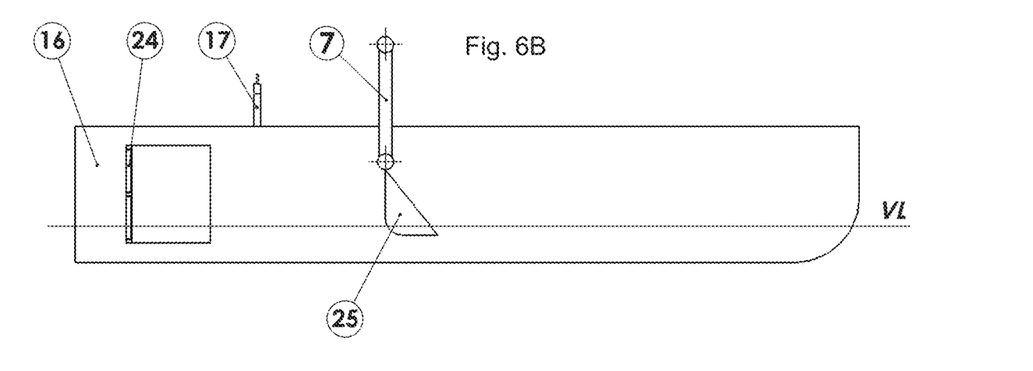

FIG. 6B shows a side view of the pontoon 16, in which are hinges 24, a rubbish collector 25 attached to the rotating boom 7, and the control desk 17.

Figure 6C:
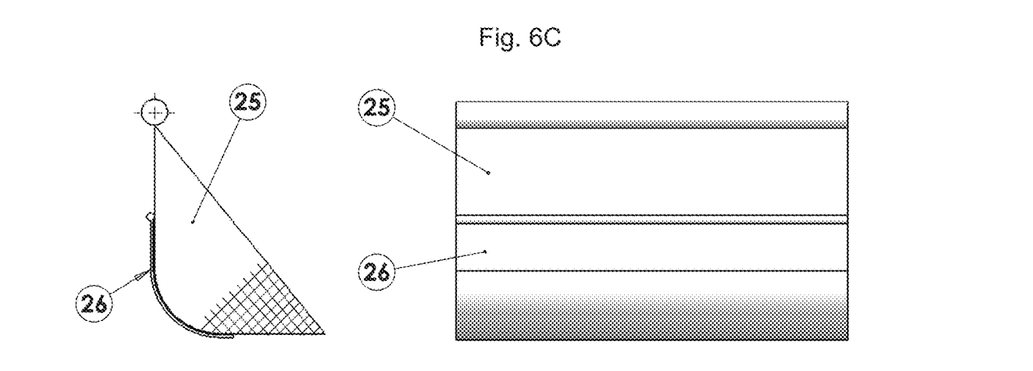

FIG. 6C shows a side and front view of the rubbish collector 25 and the emptying opening 26.

Figure 7A:
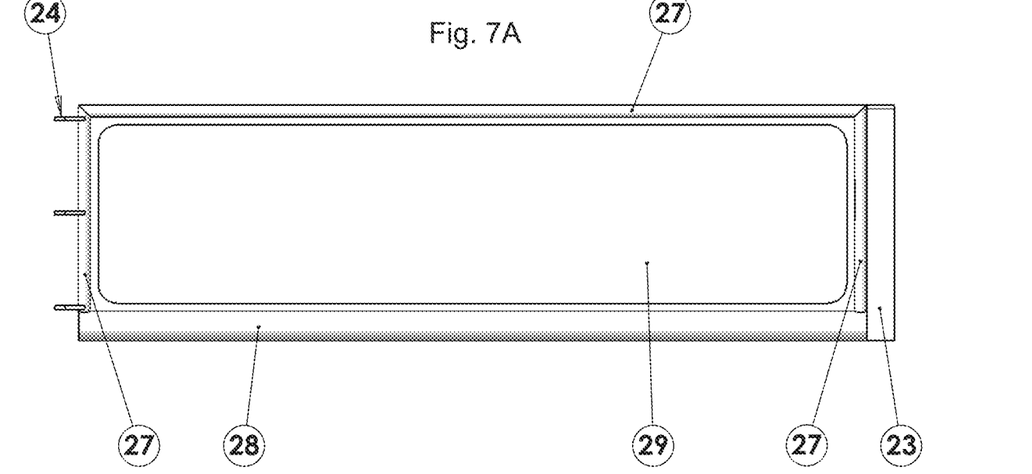
FIGS. 7A-C show the transport barge's boom from the side, top, and end.

FIG. 7A shows a side view of a boom, in which there is a tubular frame 27 around a wall 29 and the boom's lowest tube 28. The figure also shows the booms hinges 24 and universal sliding joint 23.

Figure 7B:
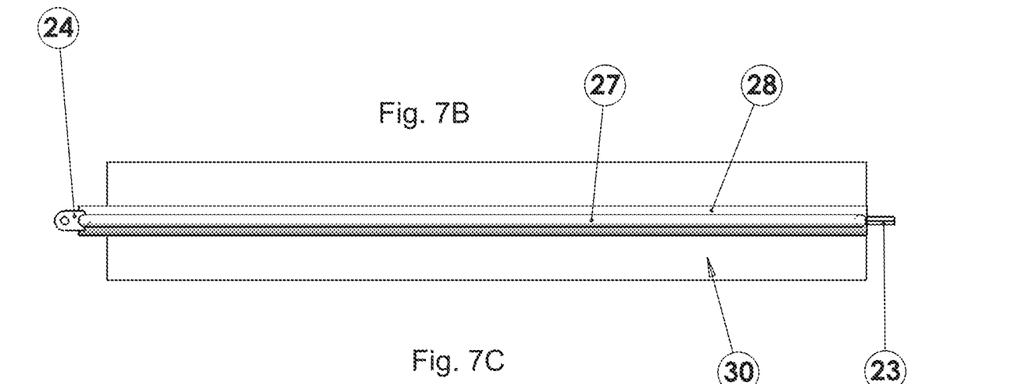

FIG. 7B shows a top view of a boom, in which are hinges 24, a universal sliding joint 23 and wings 30. The figure also shows the boom's tubular frame 27 and the boom's lowest tube 28.

Figure 7C:
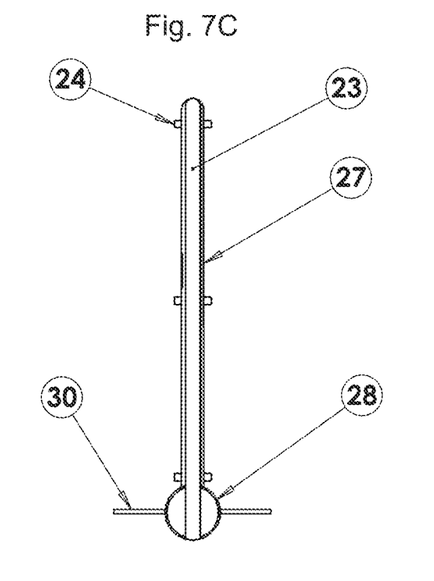

FIG. 7C shows an end view of a boom, in which is a tubular frame 27, the air space/volume of the lowest tube 28 of the tubular frame 27 around the wall 29, and hinges 24, a universal sliding joint 23, and wings 30.

On the basis of the above description, in a system according to one embodiment a transport barge 2, in the pontoons 16 attached to the deck 20 of which are oil collectors 4, is connected by a support 8 to a tug 1. In the sides of the barge 2, adjustable booms 3 equipped with hinges 24 and universal sliding joints 23 and operated by hydraulic cylinders 10 are attached, the structure of which is a wall 29 surrounded by a tubular frame 27, in which the air-space/volume of the lowest tube 28 corresponds to the boom's own weight.

The booms 3 are equipped with wings 30 for braking the lateral movement of the booms 3 in water. To control the hydraulics, a control desk 17 is located on the barge's 2 deck 20, by which are controlled not only the booms 3 but also the bagging device 5, the collector brushes 4 and 12, and the reel 14 and reeled booms 9.

If a larger collection capacity is required, rotating structures 7 are installed in the pontoons 16, to which are attached oil collectors 12 equipped with triangles 19, at the upper end of which are oil-receiving gutters 21, in pumps 22 are situated, with the aid of which oil is transferred using a hose 18 to sacks. When using a larger capacity in collection, the additional booms 9 of the deck 20 are filled with air and simultaneously pulled with the aid of auxiliary boats 15 into operation, when towable booms 13 are formed. For rubbish collected from the sea, a rubbish collector 25 can be attached to the rotating structure, through the emptying opening 26 of which the rubbish is emptied into a trough 6 acting as a receiving station. If additional length is needed for the barge's boom, the extension boom 32 in the resting position is opened to the operating position 31.

The following embodiment represent preferred solutions:

1. A vessel and an oil-collection system built inside it, to which oil is guided for collection by a guide boom attached to an inclined boom, air-filled guide booms (8) attached to the end of the transport barge's (3) guide booms (2), the supports (7) attached to the ends of the outer sides of the barge's (3) pontoons form a lateral lifting and carrying force in the ends of the barge's (3) guide booms (2) and prevent the barge (3) from turning laterally and permit the oil-spill-response unit's movement conforming to a heavy swell when being towed.

2. Oil-spill-response unit according to embodiment 1, in which the transport barge (3) is formed of two pontoons connected by a deck, inside which are oil collectors.

3. In the space between the pontoons of the transport barge (3) of an oil-spill-response unit according to either of the above embodiments is a frame-like opening structure for bagging (5).

4. Brush cassettes (12) situated in the rotating structure of a rubbish collector (10) of the transport barge (3) of an oil-spill-response unit according to any of the above embodiments can be tilted and adjusted.

5. Oil-spill-response unit according to any of the above embodiments, in which there is a reel-boom combination (13) at the end of the guide booms (2) guiding the oil (13).

6. Oil-spill-response unit according to any of the above embodiments, in which supports (7) permit the use of tugs or vessels of different sizes, without requiring changes in the structure of the transport barge.

7. Oil-spill-response unit according to any of the above embodiments, in which the bagging system operates using the NON-STOP method.

8. Oil-spill-response unit according to any of the above embodiments, in which the full oil sacks are dropped from the space between the pontoons to be taken away by the propeller wash and later collected.

9. Oil-spill-response unit according to any of the above embodiments, in which by guiding the water flow to the space between the pontoons of the transport barge, equipped with booms and brushes, and attached by supports to the vessel, the brush-disturbing effect of the water flow created by the tug is prevented and by using air-filled guide booms attached to the barge's booms a lateral carrying force is formed in the barge in a heavy sea.

10. Oil-spill-response unit according to any of the above embodiments, in which the transport barge's brushes are place in such a way that the vessel's propeller wash does not disturb collection.

The invention is not restricted to refer only to the examples presented above, instead many variations are possible while remains within the scope of the inventive idea defined by the Claims.

REFERENCE NUMBERS 1 tug
2 transport barge
3 booms (barge's)
4 pontoon's collection brushes (brush drum)
5 bagging device
6 trough
7 rotating structure
8 supports
9 air-filled guide booms located on the deck of the transport barge
10 cylinder
12 brush cassette
(11 empty)
13 air-filled booms in operation
14 reel
15 auxiliary boat
16 pontoons
17 control desk
18 hose
19 triangle
20 deck
21 gutter
22 pump
23 quick-release connector/universal sliding connector
24 hinges
25 rubbish collector
26 rubbish collector's emptying opening
27 frame (or boom)
28 lower tube
29 wall
30 wings
31 extension boom in operating position
32 extension boom in resting position

REFERENCE PUBLICATIONS

Patent Publications

EP 0 207 623
EP 2 678 217
U.S. Pat. No. 4,182,679
US 2012/085693

The invention claimed is:

1. An oil collection system for oil-spill response, the system comprising a towing vessel and an oil collection barge comprising oil collectors,
wherein the barge is attached to the towing vessel via rigid supports,
wherein the barge is towed by the towing vessel,
wherein the oil collectors are arranged at or in sides of the barge being towed, in such a way that oil can be collected from the sides of the barge,
wherein the barge comprises at least two pontoons arranged at a distance from each other, which are connected to each other to form a catamaran-like structure, and
wherein the oil collectors are arranged in, or in connection with at least one of the pontoons.

2. The system according to claim 1, wherein the barge comprises one or more oil collectors on each side of the barge, and wherein the one or more oil collectors comprise a brush drum, a brush cassette, or a combination of a brush drum and a brush cassette.

3. The system according to claim 1, wherein on at least one side, there are arranged one or more outwardly rotatable oil-guiding booms.

4. The system according to claim 3, wherein each boom is arranged in, or in the vicinity of a rear edge of a collection opening of at least one of the oil collectors, which is formed in one of the sides of the barge.

5. The system according to claim 3, wherein an extension in the form of an additional boom is attached to an end of at least one of the one or more oil-guiding booms.

6. The system according to claim 5, wherein the additional boom comprises an air-filled guide boom.

7. The system according to claim 6, wherein the air-filled guide boom is attached to an end of the one or more guide booms, so that when the system is used, they, create together with supports used to attach them to the barge, a lifting and carrying force in the ends of the one or more guide booms and prevents the barge from turning laterally and permits a movement of the barge to conform to a heavy swell when being towed.

8. The system according to claim 3, wherein the sides of the barge comprises pontoons, and wherein the barge's booms are attached to the pontoons by hinges with quick-release connectors.

9. The system according to claim 8, wherein the one or more booms comprise a wall, around which is a tubular frame, with wings being attached to a carrying part belonging to the lowermost tube of the tubular frame.

10. The system according to claim 3, wherein the height of the one or more booms of the barge correspond to at least the height of a hinge on a rear edge of a collection opening and corresponds in length at least to the distance from a rear edge of the collection opening to a point of the sides.

11. The system according to claim 3, wherein the one or more oil collectoers are adjustable to different altitudes relative to the sea surface according to a composition of the oil and are attached to the sides or outwardly-rotating support structures thereof, and wherein adjustable triangles, which seal a space between the oil collectors, the sides, and the one or more booms when running, are attached on both sides, to prevent oil escaping.

12. The system according to claim 3, wherein the barge is supported by the vessel and towed with its aid, together with the one or more booms, forms, in maritime conditions a collection unit, in which the operational dead centre is in the centre of the unit.

13. The system according to claim 1, wherein in the space between the sides of the barge is situated at least one openable bagging device for bagging the collected oil.

14. An oil-collection barge comprising a front part, which forms the barge's bow, a rear part, which is arranged at a distance from the front part and which forms the barge's stern, and side parts connecting them, which form the barge's sides,
wherein the barge is configured to be attached from its front part to the stern of a towing vessel via rigid supports, in order to be towed behind the towing vessel, and that oil collectors are arranged in the barge's side parts to collect oil from the sides of the barge,
wherein the barge comprises at least two pontoons arranged at a distance from each other, which are connected to each other to form a catamaran-like structure, and
wherein the oil collectors are arranged in, or in connection with at least one of the pontoons.

15. The oil collection barge according to claim 14, wherein the oil collectors comprise one or more oil-collection brushes.

16. The oil collection barge according to claim 14, wherein the oil collectors are adjustable to different altitudes relative to asea surface according to the composition of the oil, and are attached to the sides or to support structures rotatable outwardly from them.

17. The oil barge according to claim 14, wherein on one side of the transport barge are arranged one or more outwardly extendable oil-guiding booms.

18. The oil collection barge according to claim 17, wherein the one or more booms are each arranged in or near to a rear edge of a collection opening of at least one of the oil collectors which is formed in at least one of the sides.

19. The oil collection barge according to claim 17, wherein an extension, in the form of an additional boom, is connected to an end of at least one the one or more oil-guiding booms.

20. The oil collection barge according to claim 17, wherein in that air-filled guide booms are attached to the end of the transport barge's guide booms.

21. The oil collection barge according to claim 17, wherein the transport barge's one or more booms are attached to the sides by hinges.

22. The oil collection barge according to claim 14, wherein at least one bagging device for bagging collected oil is situated in a space between the sides of the barge.

* * * * *